FILE PROTECTION TO I/O STORAGE

Filed May 12, 1965 9 Sheets-Sheet 1

INVENTORS:
WM F. BEAUSOLEIL,
WM A. CLARK, IV
PETER R. HILL,
RONALD M. SMITH

BY Sughrue, Rothwell, Mion, Zinn & Macpeak
ATTORNEYS

FILE PROTECTION TO I/O STORAGE

Feb. 6, 1968 W. F. BEAUSOLEIL ET AL 3,368,207

FILE PROTECTION TO I/O STORAGE

Filed May 12, 1965 9 Sheets-Sheet 3

Feb. 6, 1968 W. F. BEAUSOLEIL ET AL 3,368,207

FILE PROTECTION TO I/O STORAGE

Filed May 12, 1965 9 Sheets-Sheet 6

Feb. 6, 1968 W. F. BEAUSOLEIL ET AL 3,368,207

FILE PROTECTION TO I/O STORAGE

Filed May 12, 1965 9 Sheets-Sheet 7

3,368,207
FILE PROTECTION TO I/O STORAGE
William F. Beausoleil, Le Cap d'Antibes, France, and William A. Clark 4th, Wappingers Falls, Peter R. Hill, Beacon, and Ronald M. Smith, Poughkeepsie, N.Y., assignors to International Business Machines Corporation, Armonk, N.Y., a corporation of New York
Filed May 12, 1965, Ser. No. 455,058
10 Claims. (Cl. 340—172.5)

ABSTRACT OF THE DISCLOSURE

File projection for a data processing system comprising a central processing unit having peripheral direct access storage means shared by more than one user station, characterized by selective masking means controlled by the central processing unit in response to problem programs presented to the central processing unit by user stations, for excluding individual user stations from access to all areas of the storage means except those respectively allocated to them by program means of the central processing unit, the masking means being effective for reading, as well as writing, access, and for specific portions of each record stored in the area assigned to a user.

This invention relates to data processing systems and particularly to means for protecting information on specified areas of direct access, or random access storage devices from unauthorized or inadvertent access.

At the present time, there are data processing systems which comprise a CENTRAL PROCESSING UNIT (CPU) serving many different users, each having information stored in the CENTRAL PROCESSING UNIT and/or its peripheral storage devices. In the more advanced systems of this type it is possible for indirect transfer of information between a user station input/output (I/O) device and a peripheral storage device of the CPU to proceed concurrently with, and independently of, data processing operation of the CPU, once communication has been established by the supervisory program of the CPU. The sharing by many users of a common central processing unit with common storage facilities raises a problem of the privacy of the stored information, as between the different users of the CPU. Also, there is the possibility of a user, through an error in the command coding, performing an unintended operation, such as erasing stored data which should not have been erased.

Means are already available for protection of different blocks of storage in MAIN MEMORY (core storage) of the CPU against accidental or unauthorized erasure. However, these means do not prevent the reading of information by one user from a block allocated to another user. Furthermore, the protection so far offered does not extend to information stored in the peripheral storage units peripheral to the CPU, such as disc, drum, strip storage, etc., all generically referred to as "direct access storage."

It is an object of the invention to protect information stored on direct access storage devices peripheral to a CPU against unauthorized access.

It is a further object to protect such files against unauthorized reading as well as writing.

It is a further object to provide a variable degree of protection of the information stored in direct access storage, that is to say, a protection which can be varied in respect to the type of access, whether reading or writing, or the geographical limits within which access is permitted, or in both of these respects.

The operating system (a control program) realizes the objects of the invention by allocating different portions of the direct access storage devices associated with a CPU to particular data files, respectively, then monitoring the requests for access to the data files, by the use of different identifying names in the problem programs and by novel masking means.

For example, in a preferred form of the invention, the CPU stores in a catalog (in a portion of main memory or external storage) coded control information pertaining to specific data files used by problem programs of each different user of the CPU. For each data file the catalog includes a name by which the data file is identified and, associated therewith, the geometric boundary limits of the direct access storage area assigned to that data file. In case of a disc file the limits are specified by cylinder number and head number, the code being in the form CCHH, each of these pairs of letters representing two bytes (8 bits) of coded indicia identifying a cylinder number and a head number, respectively. There are two successive sets of these bytes, the first representing the high limit of the direct access storage area and the second the low limit. In addition, each catalog entry includes a mask byte representing coded indications of the particular type of access permitted in the data file area by a problem program. This mask will, for example, limit access to reading data, or it may limit the program to writing particular portions of a record, such as COUNT, KEY, DATA or KEY, DATA or DATA, these being different portions of a record.

The original entry in the catalog is made in response to a request by a particular problem program for allocation of an area of storage of specified extent, say ten tracks. The request would also state what limitations concerning the character of access to be permitted are to be placed in the mask. The specification of upper and lower boundary limits for the area, however, is assigned by the CPU and is not known by the problem program. The original request for allocation of ten tracks of storage area has the effect of causing the CPU to find an available group of ten tracks and to write the upper and lower limit addresses and the mask pertaining to the data file as an entry in the catalog. Thereafter, any problem program desiring access to a particular data file will give the name of the data file and the operating system will identify the portion of the related direct access device by symbolic track number within the group of, say, ten tracks originally requested for the problem program to be used to store the data file. The system will then proceed to attempt to establish a channel program in accordance with the request to operate upon the data file. But if there is any discrepancy between the type of access, or extent of access, and the mask and boundary limits recorded in the catalog, the channel program will be interrupted and a record made of the interruption and the reason for it. This information will be returned to the problem program which requested operation upon the data file.

The invention will be explained more fully by reference to a specific embodiment of it shown in the drawing and other objects, features and advantages of the invention will appear in the description.

Figure 7:
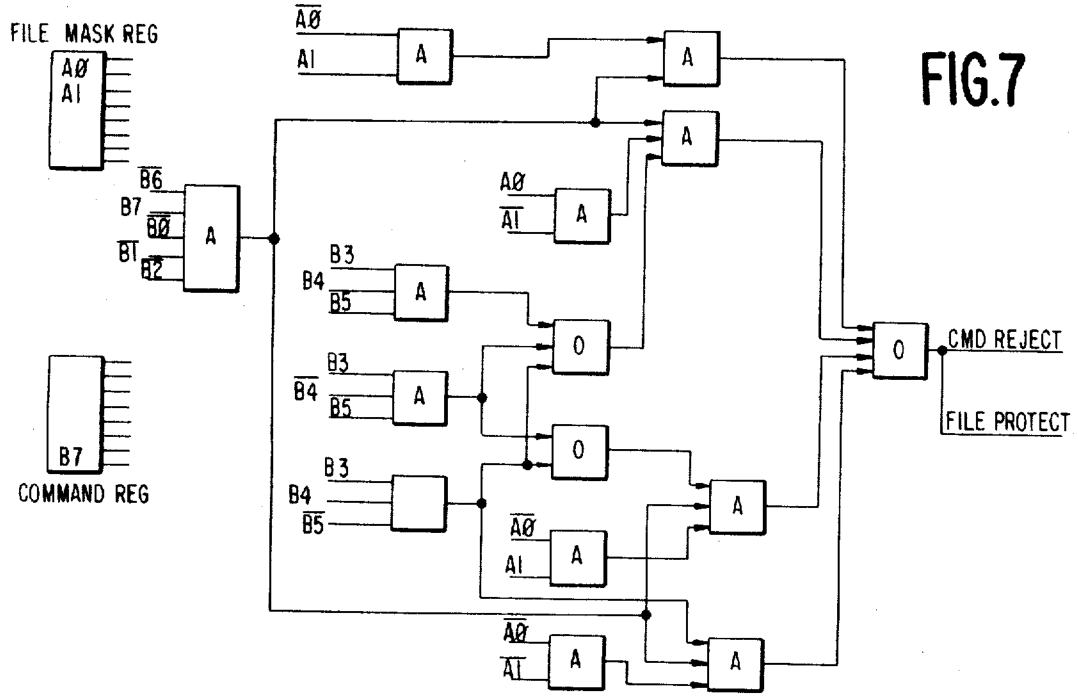
Figures 8, 9:
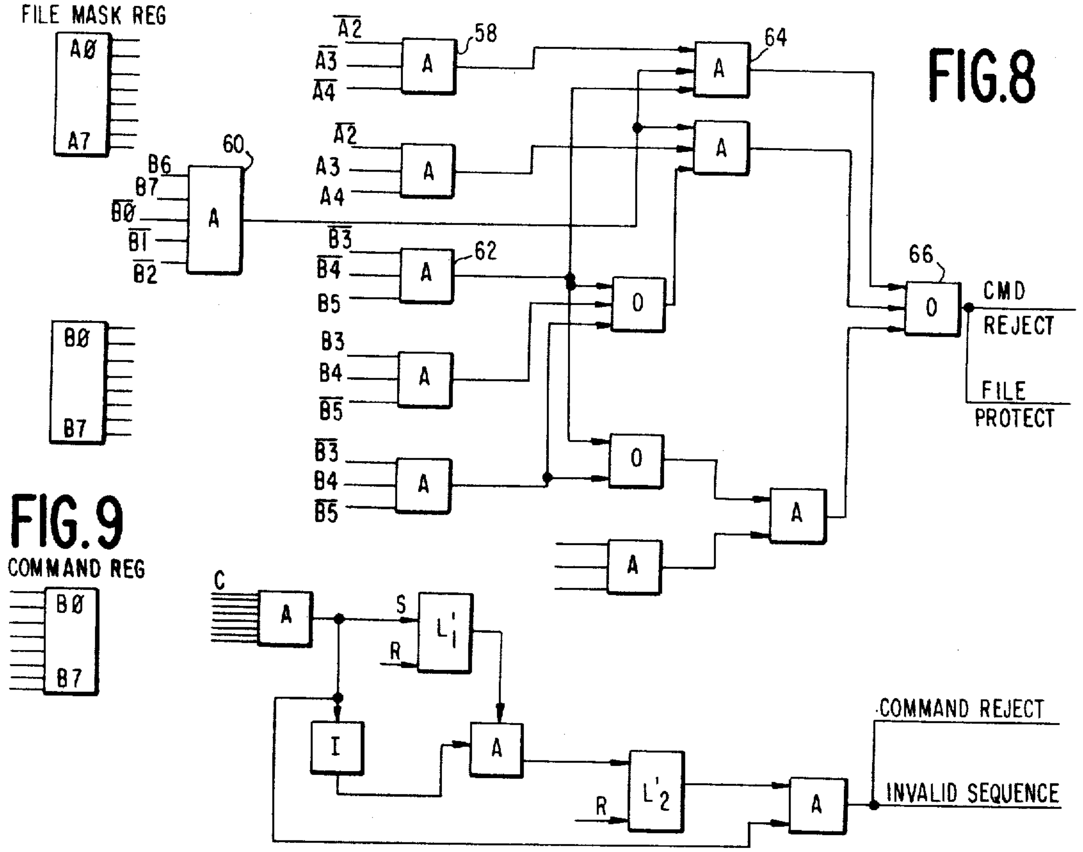

FIGS. 6A–E are simplified block flow diagrams of the logic used to execute channel commands concerned with file protection;

FIG. 7 is a logic network related to the rejection of write commands;

FIG. 8 is a similar logic network pertaining to the rejection of seek commands; and FIG. 9 is a logic network having the function of preventing more than one set mask channel control word per channel command chain.

The illustrative embodiment chosen for explanation of the invention is applied to an IBM System/360. The basic structure of this system is disclosed in two applications of Gene M. Amdahl et al., Ser. No. 357,372, filed Apr. 6, 1964, and Ser. No. 357,387, filed Apr. 6, 1964. Reference is made to these two applications for details of the structure of the basic IBM System/360, insofar as it is utilized in the present invention.

Figure 1:
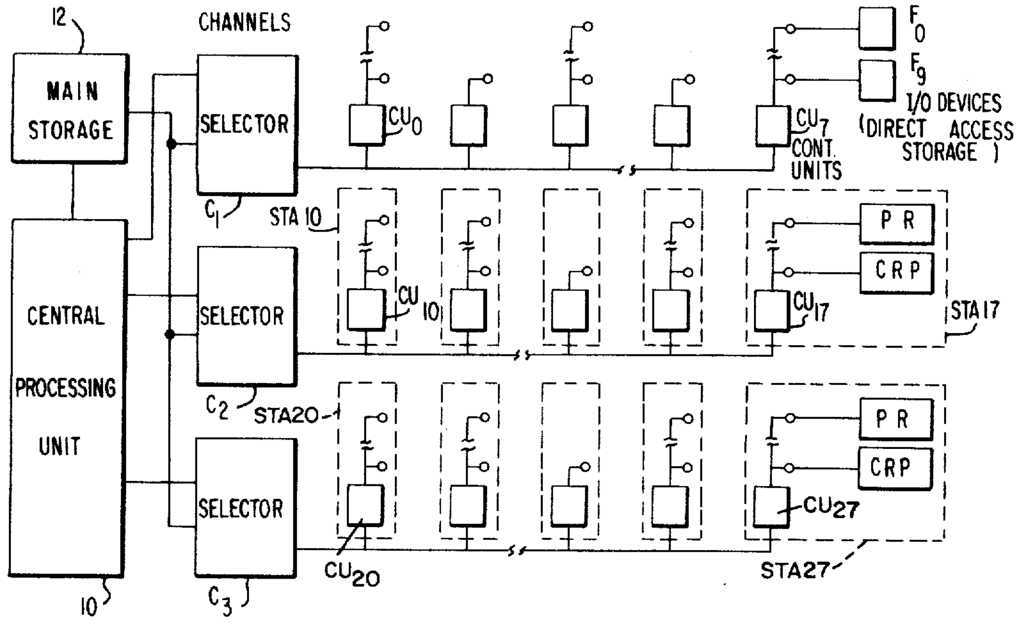
FIG. 1 is a general block diagram of a data processing system comprising a central processing unit with multiple associated user stations and peripheral files.

FIG. 1 shows the main elements of a CENTRAL PROCESSING UNIT system. These include the CENTRAL PROCESSING UNT proper, 10, and the MAIN STORAGE 12, which is a core storage accessible to the CPU at the highest speed of the data processing operations. Connected to both the CPU and MAIN STORAGE are a plurality of CHANNELS C1, C2 and C3, shown here as being of the selector type, for simplicity, though such a system may include a multiplexer type of channel as well.

CHANNEL C1 is connected through a plurality of CONTROL UNITS CU0–CU7, to various direct access I/O devices. The I/O devices F0–F9 connected by a CONTROL UNIT CU7, for example, may be disc files of the IBM 1302 type.

CHANNELS C2 and C3 provide communication between the CENTRAL PROCESSING UNIT and MAIN STORAGE, through CONTROL UNITS CU10–CU17 and CU20–CU27, to I/O devices pertaining to various separate stations of terminals represented by dash rectangles, *Sta*10–*Sta*17 and *Sta*20–*Sta*27. The I/O devices at the different stations will be suited to the type of data processing required by the individual station and will include a means for transmitting programs and data to the CPU, such as an IBM 1402 Card Read-Punch, CRP, and for receiving data from the CPU, such as the Card Read-Punch, a printer PR, such as an IBM 1403, etc.

In general, a station operator will set up on an I/O device pertaining to his station (card reader) a problem program which will symbolically request access to a particular area of direct access storage peripheral to the CENTRAL PROCESSING UNIT. The request is made by the problem program providing the name of the data file to be accessed. The catalog of data files is then searched to locate the address of the requested data file. The problem program may include a request to read or a request to write in the designated area. For example, the operator of station *Sta*17 may place in the card read-punch CRP a set of cards including a program requesting access to a specified storage area in direct access storage F0 for the purpose of writing in that area. The request of station *Sta*17 will be recognized by the CPU through operation of the known interruption procedure, whereby at the end of the current instruction being performed by the CPU, it may accept the I/O request and, subject to conditions to be described, initiate a channel program through CHANNEL C2 to write in the portion of the file F0 specified in the problem program. the data which was transmitted from the I/O device at station *Sta*17 and temporarily held in main storage, pending execution of the program.

Requests to read are processed in a similar manner, but the data is transmitted in the reverse direction.

Figure 2:
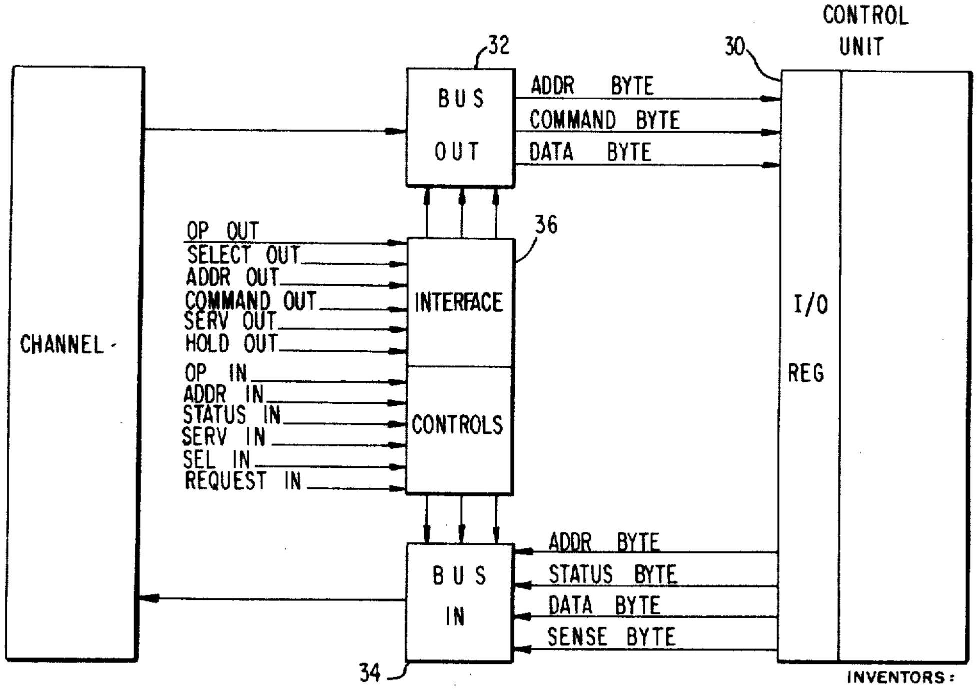
FIG. 2 is a symbolic block diagram of a CHANNEL, a CONTROL UNIT, and the INTERFACE between them.

As shown in FIG. 2, a CONTROL UNIT, such as

CU7 in FIG. 1, includes an I/O register 30, connected with a CHANNEL, such as C1, by an INTERFACE including BUS OUT means 32 and BUS IN means 34, providing connections for transmission of commands and data between the CHANNEL and the CONTROL UNIT; and INTERFACE CONTROLS 36 regulating the operation of the BUS OUT and BUS IN means. The INTERFACE CONTROLS include a series of tag lines identified with the functions specified on each line, which severally control AND gates in the BUS OUT and BUS IN sections of the INTERFACE, to selectively pass various commands and data from the CHANNEL to the I/O register of the CONTROL UNIT and from the I/O register back to the CHANNEL. Every command or data byte which enters or leaves the CONTROL UNIT does so by way of the I/O register.

A channel program is initiated to gain access to any I/O device. A channel program is initiated by a START I/O instruction addressed to a particular I/O device and, generally, to a particular location in the device, the code identification of which is derived from the data file catalogue entry. The channel program is always begun by the following three commands from the operating system of the CPU: Seek, Set File Mask, and Transfer in Channel. The Seek command will place the access mechanism of the addressed I/O device on the desired track by means to be described presently. The Set File Mask command will cause a configuration of bits to be set up in the FILE MASK REGISTER 38 of the CONTROL UNIT, which configuration will inhibit or permit execution of certain commands in the subsequent channel program. It may also cause high and low track boundaries to be set up in a group of BOUNDARY REGISTERS 40, 42, 44, 46 of the FILE MASK, to establish area limits within which every subsequent command of the problem program must be confined.

The Set File Mask command is command chained to the Transfer in Channel command, which transfers the channel program execution to the address of the channel program in MAIN STORAGE belonging to the initiating problem program and continues the channel program. Subsequent Read or Write commands will set up the communication path through which data records will be transferred from the block of MAIN MEMORY to the area of the file storage selected, if it is a WRITE command; or from the area of file storage to a block of MAIN MEMORY, if it is a READ Command.

Detailed explanation of the execution of the Seek command will be deferred, for a reason which will become apparent, and the description will now proceed to the Set File Mask command.

The Seek command is command chained to the Set File Mask command. The Command Out tag (FIG. 2) is raised and a command byte is transferred to the I/O register 30, whence it is transferred to the Command Register 50 through decoding means 52. Thereupon the CONTROL UNIT asks for the file mask byte to be placed into the File Mask Register 38. The Transfer is made by way of a buffer register 31. This byte determines what inhibitions are to be placed upon writing and reading, in accordance with the following table, in which the headings B0–B4 signify bit positions in which various combinations of ones or zeros are shown.

TABLE I.—WRITE FILE MASK

| B0 | B1 | | |
|---|---|---|---|
| 0 | 0 | Inhibit | Write Home Address. |
| 0 | 1 | do | Do. |
| | -------- | do | Write Record Zero. |
| | -------- | do | Write Counts, Key and Data. |
| 1 | 0 | do | All Write Commands. |
| 1 | 1 | Permit | Do. |

TABLE II.—SEEK FILE MASK

| B2 | B3 | B4 | |
|---|---|---|---|
| 0 | 0 | 0 | Permit All Seek Command. |
| 0 | 0 | 1 | Permit Seek CCHH & Seek HH CCW's. |
| 0 | 1 | 0 | Permit Seek HH CCW. |
| 0 | 1 | 1 | Inhibit All Seek Commands (inhibits head switching). |

Figure 6A:
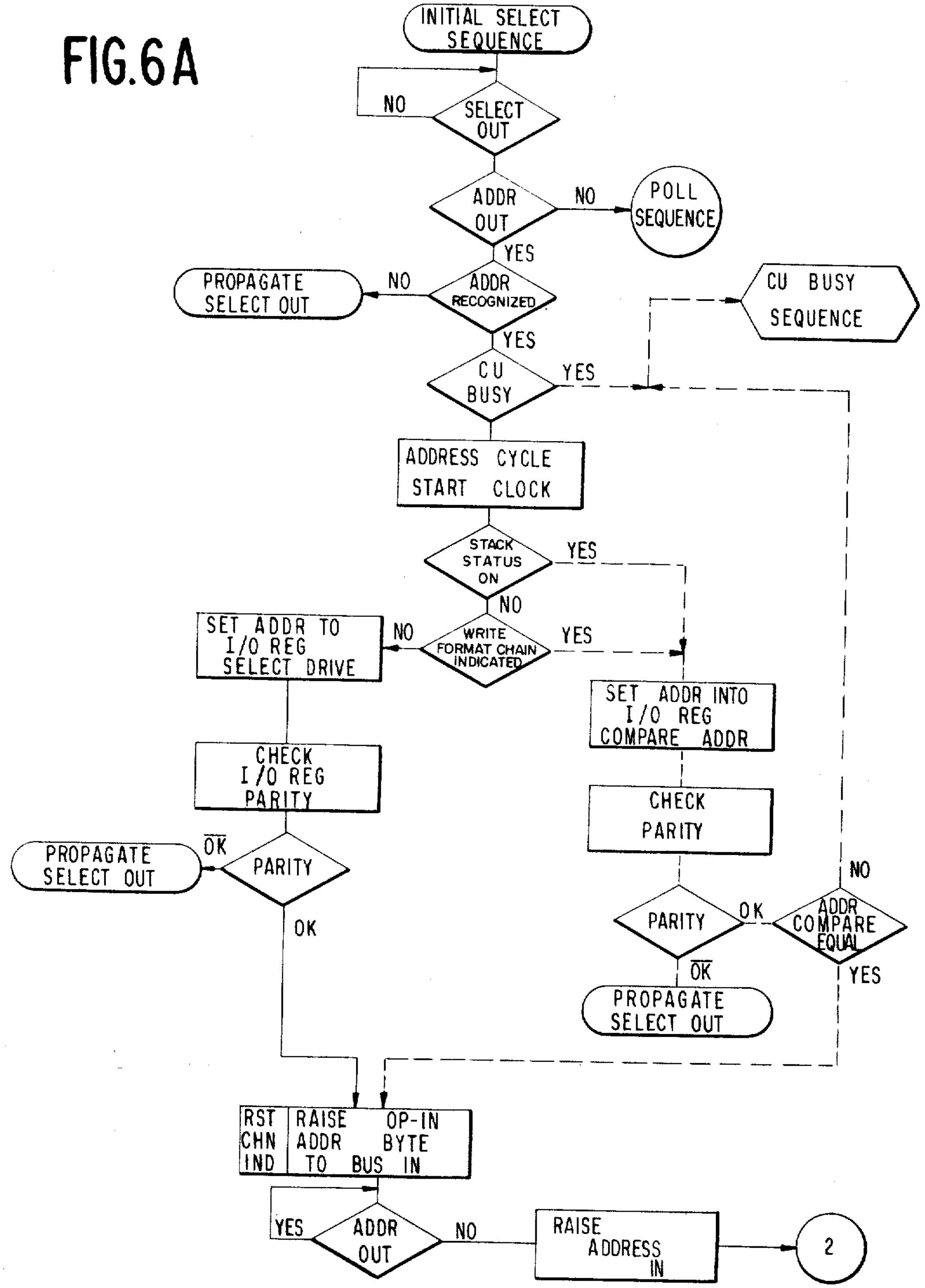
Figure 6B:
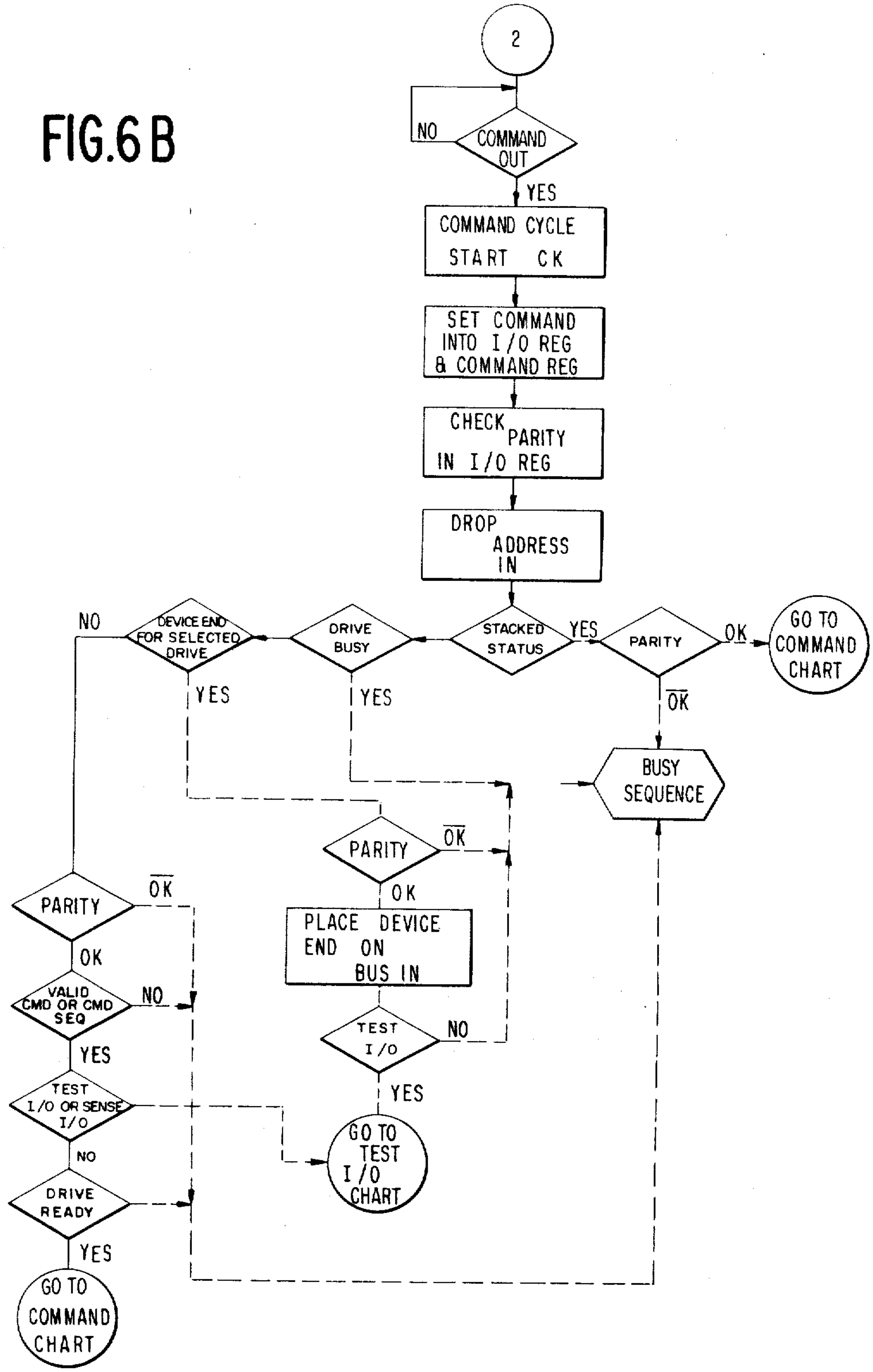
Figure 6C:
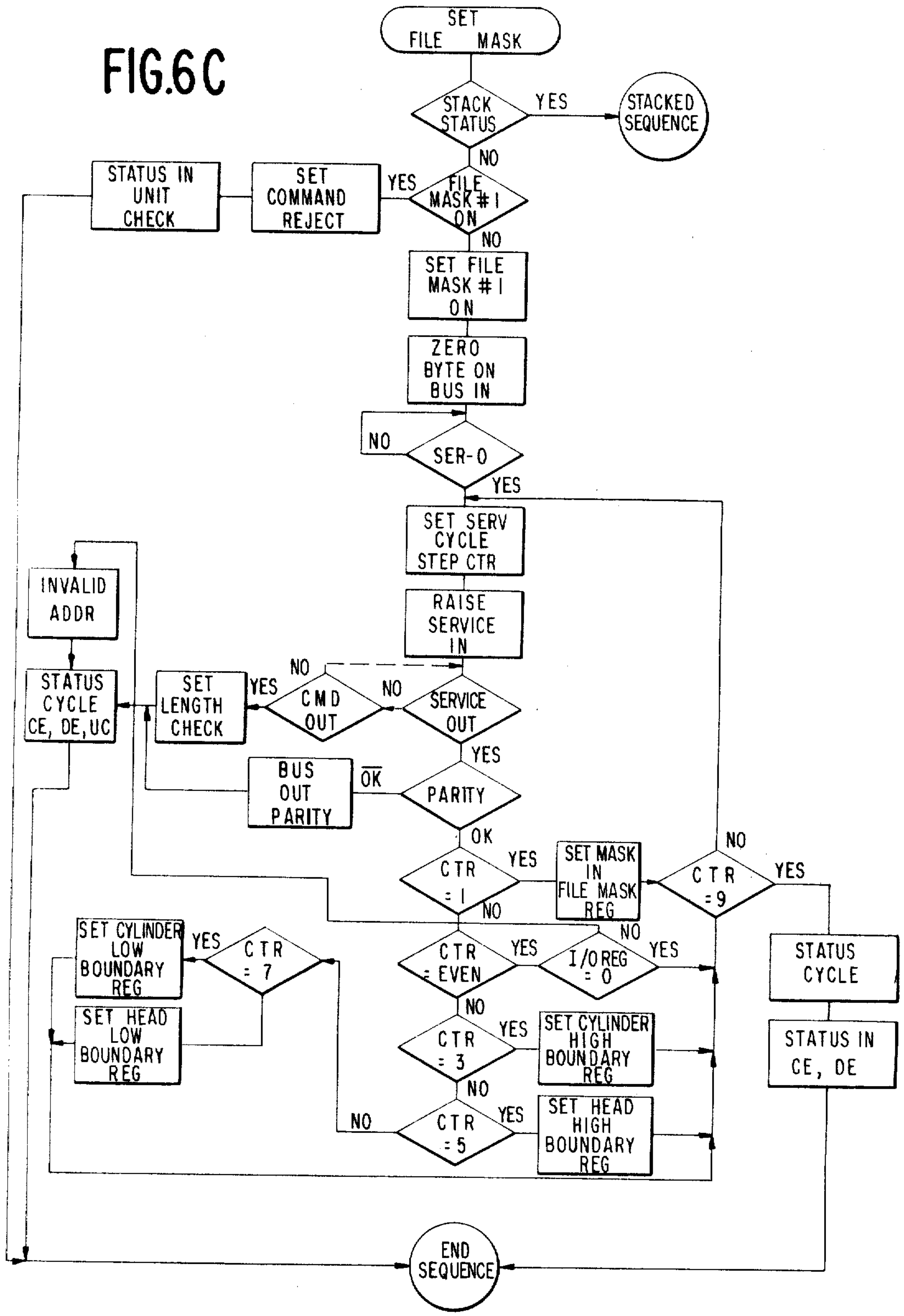

The CONTROL UNIT includes a so-called "Service Cycle Step Counter" 54, which is controlled by the command register during set file mask operations, to direct the file mask code into the File Mask Register 38 and bytes of the boundary codes into respective registers identified as Cylinder High Reg., 40, Cylinder Low Reg., 42, Head High Reg., 44, Head Low Reg., 46. The first signal from the Command Register 50 resets the Service Cycle Step Counter to position 1 (see FIG. 6C, block 70). Accordingly, the first byte of the set file mask word is directed by the Service Cycle Step Counter into a section of the File Mask Register 38 which determines the general type of limitations to be imposed upon the access of the channel program to the data file on the I/O device. As the diagram, FIG. 6C, shows, a test of the Service Cycle Step Counter at this time shows it to be in position 1, which directs the said first byte into that section of the File Mask Register. Following this the step counter is tested to determine whether it is in position 9 and since it is not, the loop returns to advance the Service Cycle Step Counter, to raise Service Out tag line to bring the next byte of the Set File Mask command to the I/O Reg., then to test the counter. The tests shows the counter not equal to "1," but equal to "even," since it has stepped from 1 to 2. This begins the sequence to set boundary addresses into the BOUNDARY REGISTERS 40–46. A test of the I/O register is made to determine whether it shows all zeros, as it should for the first byte of the boundary codes. If not, an Invalid Address signal (block 60) terminates the channel program and stores in the Status Register a Channel End, Device End, and Unit Check (U.C.) condition. The cause of the termination is reflected back to the CPU and thence to the problem program terminating station, in a manner to be described later.

If the I/O register shows all zeros, the following test of the counter shows it is not equal to 9 and the program returns to "Set Service Cycle Step Counter," advancing the counter to 3. The next byte of the set file mask word standing in the I/O register identifies the high boundary cylinder of the permitted access area. The test shows the step counter in position 3 and the high cylinder boundary byte is accordingly directed into the cylinder high register.

The program continues in the manner shown in FIG. 6C, with even positions of the counter causing a test for zeros in the I/O register and a return of the program to advance the step counter by one step. Thus, the high head boundary, the low cylinder boundary, and the low head boundary are set into the corresponding boundary registers on alternate odd steps of the step counter, a new byte being set into the I/O register at each step. On the final and ninth step the test passes through counter equal 7, with a "no" result, causing the low head boundary to be set in the Head Low Boundary Register 46, following which the counter tests equal to 9 and the sequence is ended with a Channel End and Device End signal transmited to the STATUS REGISTER. If all steps of the sequence went through without error, the STATUS REGISTER shows no U.C. bit and the status presented to BUS IN initiates the Transfer in Channel command.

*Channel program*

In explaning the Channel Program transferred to by the Transfer in Channel command, reference will be made, first, to FIGS. 2, 3, 4, 6A, 6B, and 6D. It will be assumed that the File Mask Register has received a setting, in the manner described just above, of 00001 (see Tables I and II), which will permit all WRITE commands except WRITE HOME ADDRESS and also SEEK CYLINDER and SEEK HEAD commands. The access mechanism of the direct access storage stands at an address determined by the execution of the SEEK command in the previous portion of the channel program. This address is reflected by an "Old Cylinder Address" standing in a register 80 of the I/O device, and by a "Head Address" standing in a register 82 of the device.

The initiation of a Channel Program begins with the address of the I/O device specified in the Start I/O instuction by the problem program. As the Channel Program begins, the channel will place the first byte of this address on BUS OUT and raise INTERFACE CONTROL tag lines Address Out and Select Out in the sequence shown in FIG. 4. The CONTROL UNIT attached to the INTERFACE will raise the Operation In tag line and place on the BUS IN 34 its own address. The sequence of operation can be followed on FIG. 6A.

The channel, upon receiving the Address In from the CONTROL UNIT, will place the Command byte to be executed by the CONTROL UNIT on BUS OUT and will raise the Command Out tag line. The CONTROL UNIT will accept the command and drop Address In. The status of the device will then be checked and the CONTROL UNIT will raise the Status In tag line. This causes the status byte from Status Register 48 to be fed back to the channel through the I/O register and BUS IN. The Status Register contains information concerning any cause for ending the channel command and channel program. Some of the individual causes will be referred to later. If the byte returned to the channel is all zeros, the status is clear and the channel command will continue.

Assume the command is SEEK. It will be transferred to the Command Register 50 after being decoded in Command Decode means 52. Following the sequence of steps shown in FIG. 6D, there being no file protect violation, the zero status byte will be transferred to the channel and the Service Out tag line raised. This will cause the resetting of a Step Counter 54 to step 1 and the first byte of the address following the SEEK command will be set into the I/O register. This address is in the form BBCCHH. The BB portion of the address should be two zeros, because they are not used in the particular machine being described. In the following steps of the program the address bytes are to be successively compared with the high and low boundaries stored in the register 40–46, in the symbolic block 58 (FIG. 3) labeled "High, Low, Equal, Compare." The first comparison is made with the Step Counter in position 1, which accordingly produces a "yes" output at the decision step labeled "CTR <4." The output from this decision tests the condition of the I/O register which should equal zero to produce a "yes" output to the decision step "CTR=6." Here a "no" output returns the loop to the beginning and advances the Step Counter to position 2. This sequence is repeated for steps 2 and 3, since the I/O register should show zeros in each of these steps. If they were not zeros, the "no" output would cause a "Set Invalid Address" to end the sequence.

With new bytes having been set into the I/O register for each loop of the program and with the counter standing at 4, the test of "counter <4" produces a "no" output and "counter=4" a "yes" output. This causes the I/O register to be compared with the Cylinder High reging at 4, the test of "counter <4" produces a "no" output, the "Set Invalid Address" (see FIG. 3, block 60) is activated and sets Channel End (Ch End), Device End and Unit Check, "U.C.," in the Status Register and the Sense Register. The Unit Check condition in the Status Register causes a termination of the channel command. The contents of the Status Register are presented at command termination. The contents of the Sense Register can be obtained by the control system via a Sense Command.

If the result of the comparison of the byte in the I/O register with the Cylinder High Register indicates the I/O register to be equal to, or lower than, the Cylinder High Register, a "yes" output causes a second comparison to be made, this time with the Cylinder Low Register. The resulting decision, if it is "yes," sends the New Cylinder Address to the Drive Circuits of the I/O device, to be described presently. The addressed cylinder is within the boundaries set by the Set File Mask command. The output also tests the Step Counter for "counter=6" and, since the counter was at step 4, the "no" output initiates a new loop. With the Step Counter at step 5 the signal passes through counter<4 and counter=4 to counter=5, where a "yes" output tests the I/O register to determine whether its byte is equal to zero, as it should be. If the test is positive the "counter=6" test is again made and the "no" output initiates another loop. This time the test for "counter=5" produces a "no" output, causing the byte in the I/O register to be compared with the Head High Register. The test determines whether the I/O register is equal to or lower than the Head High Register. If it is not, the Set Invalid Address causes an output from block 60 in FIG. 3, which produces the same result as previously described. If the result of the test is "yes" a comparison of the I/O register byte with the Head Low Register is made and a "yes" result will send to the I/O drive section of the CONTROL UNIT the New Head Address. The addressed head is within the boundaries set. The signal also tests "CTR=6" and produces a "yes" output which initiates a Status cycle and arms the Device End (DE) latch in the Status register. It also signals "Channel End" and lifts the Status In tag line, generating an End Sequence signal.

An abbreviated version of the file protection scheme, which omits the boundary registers, would permit protection only on hardware geometric boundaries, that is, tracks and cylinders of the particular direct access device. This can be accomplished through the utilization of additional bits in the first byte accepted by the Set File Mask command. One bit could be used to indicate that the Channel Program may not leave the presently addressed track. Another bit could be used to indicate that the Channel Program may not leave the presently addressed cylinder. The first bit would prohibit switching of heads, while a second bit would prohibit movement of the heads to a different cylinder.

*Drive circuits*

In the preceding description of the execution of the SEEK command in the Channel Program, it was stated that when the tests of the Cylinder Address produced a positive result the New Cylinder Address was sent to the Drive Circuits. The manner in which this occurs will now be described.

The Valid Cylinder Address is transferred from the I/O register through the Buffer register 31 to Adder 86, where it is compared with the Old Cylinder Address standing in register 80 of the device where the Old Cylinder tag line, Old Cyl., is lifted. The difference between the addresses is transmitted to File Address register 88 of the CONTROL UNIT; then, when the Difference tag line, Diff., of the Drive Interface controls is lifted it is transferred to Difference register 90 in the device.

Once the Difference register has been loaded, the new cylinder address is transferred from the buffer register to the File Address register. The raising of the cylinder tag causes it to be transferred to the Old Cylinder Address register.

When the Head Address tests "valid," the Head Address is transferred from the I/O register through the Buffer register to the File Address register. The lifting of the Head plus/minus tag line then causes a selection of a head and provides a plus/minus direction to be used by the difference register 90 in moving the access mechanism to the desired cylinder.

*Writing data*

Figure 5:
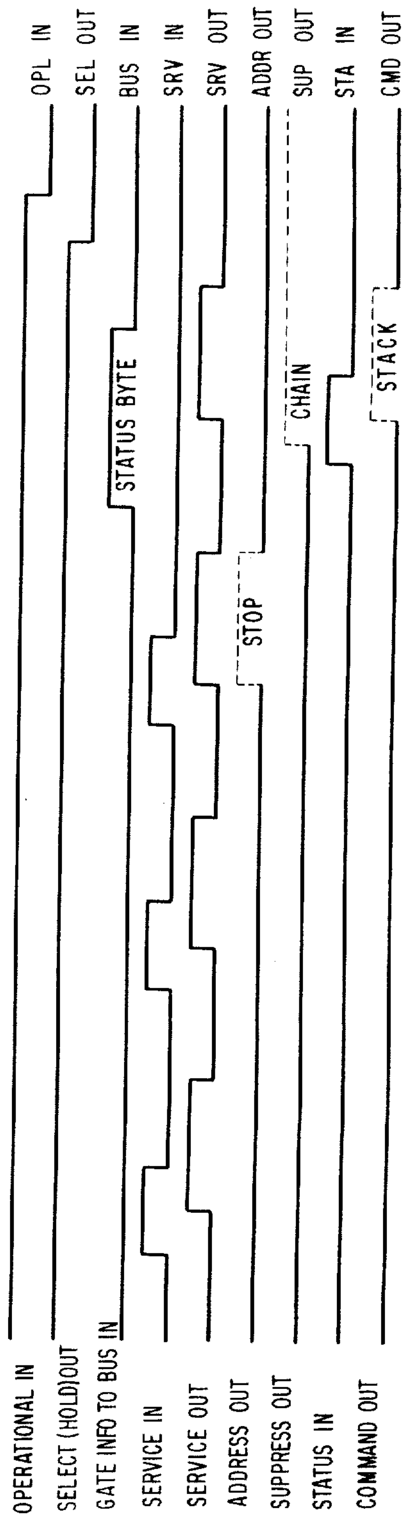
FIG. 5 is a timing diagram of the selector channel data transfer read or write and end status functions.

Assume that the problem program requests the channel program to include a command to WRITE data in the track located by execution of the SEEK command as just described, to up-date record R3 of this track. The File Mask contains code 00 in bits B0 and B1, standing for "inhibit write home address." This code raises the output on AND gate 100, but since the output of block 102, which permits writing is down, and block 104 would be up only on a command to write HOME ADDRESS, no signal will be given to set File Protect and Command Reject. Consequently, no unit check signal will be sent to the Status register and no signal will be sent to the Sense registers if a Write Data Command is issued in the channel program. A SEARCH command must precede any WRITE command to provide orientation on record R3. The command byte is sent into the Command register 50. This will cause ID numbers of the records on the selected track to be read into the CONTROL UNIT in time with the "Service Out" line of FIG. 5, for successive comparison with the record number of the SEARCH command. On finding an equal comparison the Write command will be initiated and data will be transferred in successive bytes from the CPU through the channel to the I/O register to the track.

*Set file mask*

Figure 3:
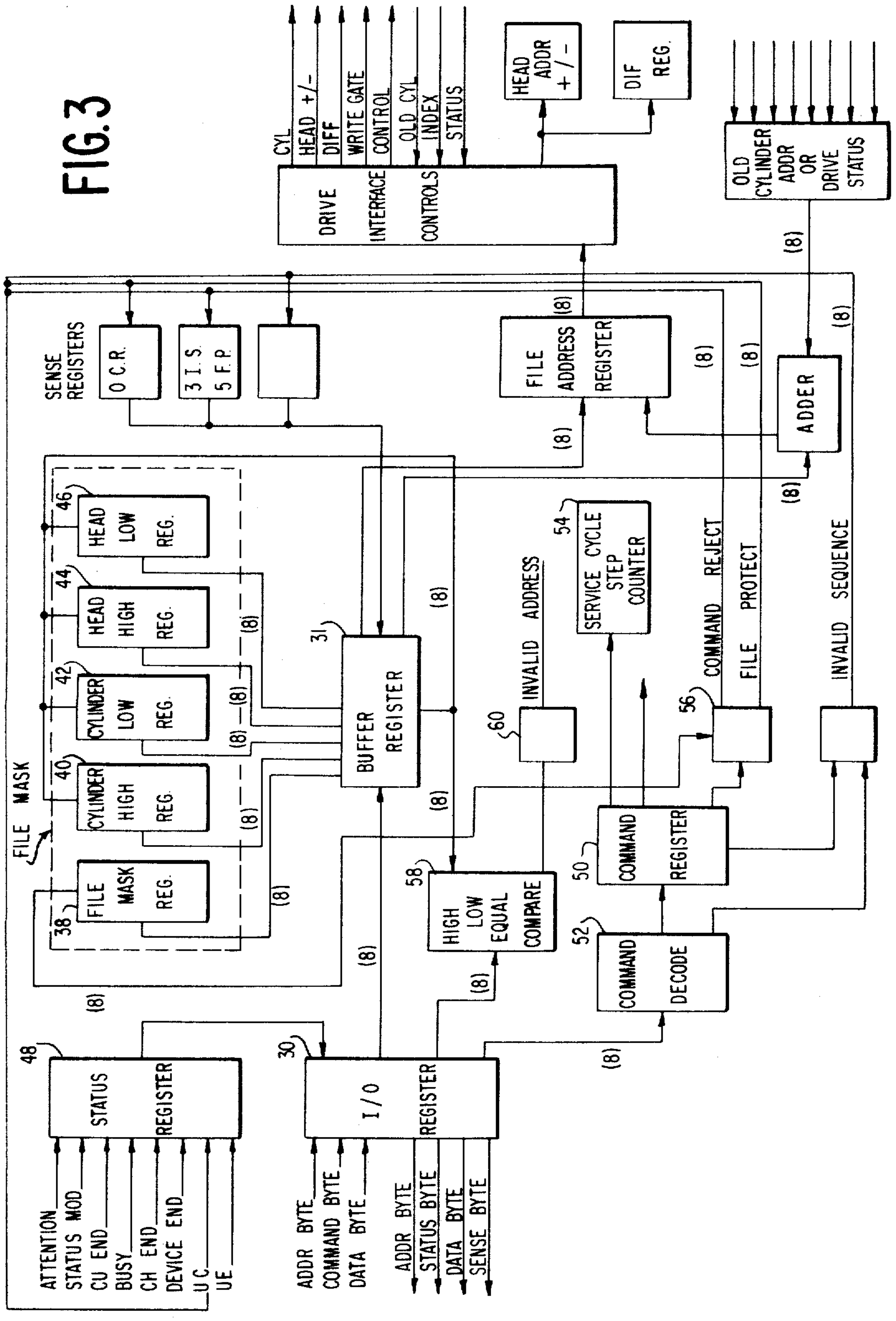
FIG. 3 is a block diagram of one of the control units of the system.
Figure 4:
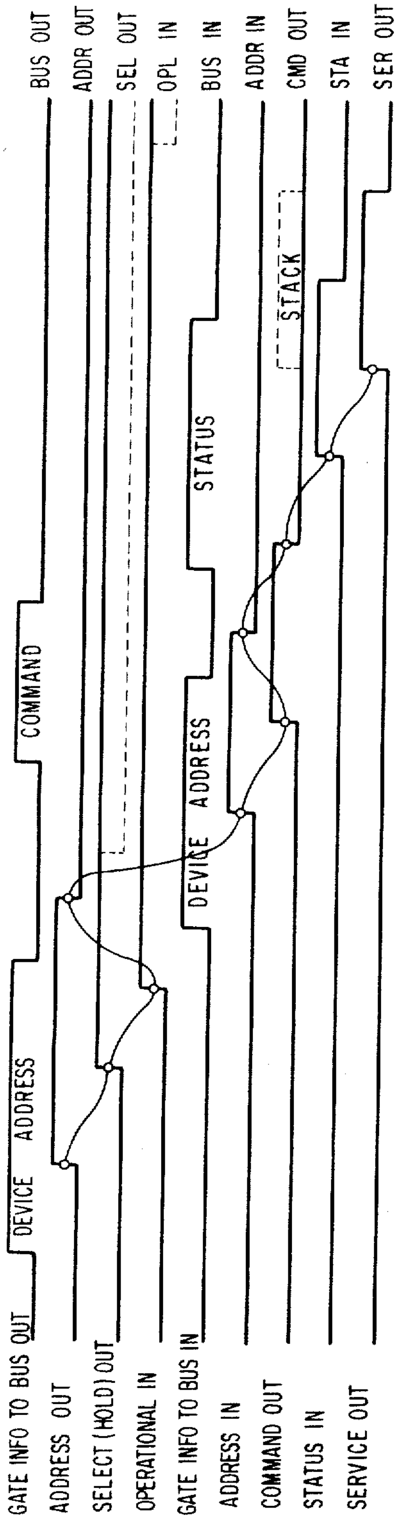
FIG. 4 is a diagram of initial selection sequence timings.

FIG. 9 shows a logic network, represented in FIG. 3 as block 110, for preventing more than one Set Mask CCW per command chain. This is necessary because the Set Mask CCW may appear anywhere in a command chain, but there must be not more than one. The one is set by the control program into the beginning of the channel program. The first Set File Mask command in the command register will raise the output of AND gate 120 and set latch 122. Thereafter, the output of 122 is AND-ed with the inverted output of AND gate 120, when the output of 120 drops. Any subsequent Set Mask CCW will then combine with the output of latch 124 at AND gate 126 to transmit command Reject and Invalid Sequence signals to set the Status register and Sense registers. Thus, terminating the channel program. This prevents the problem program from changing the file mask set by the control program at the beginning of any channel program.

*Execution of control program seek command*

Figure 6D:
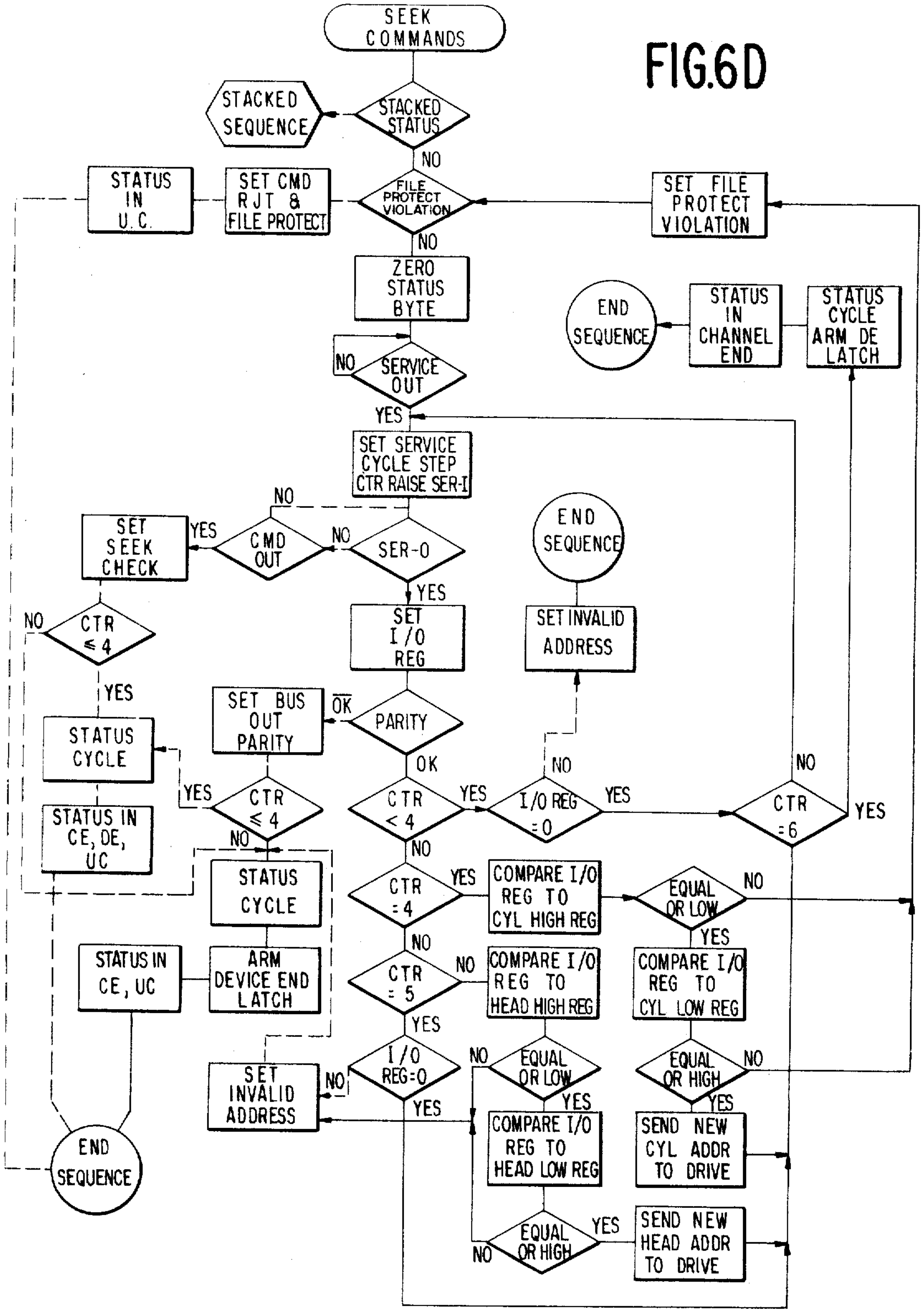
Figure 6E:
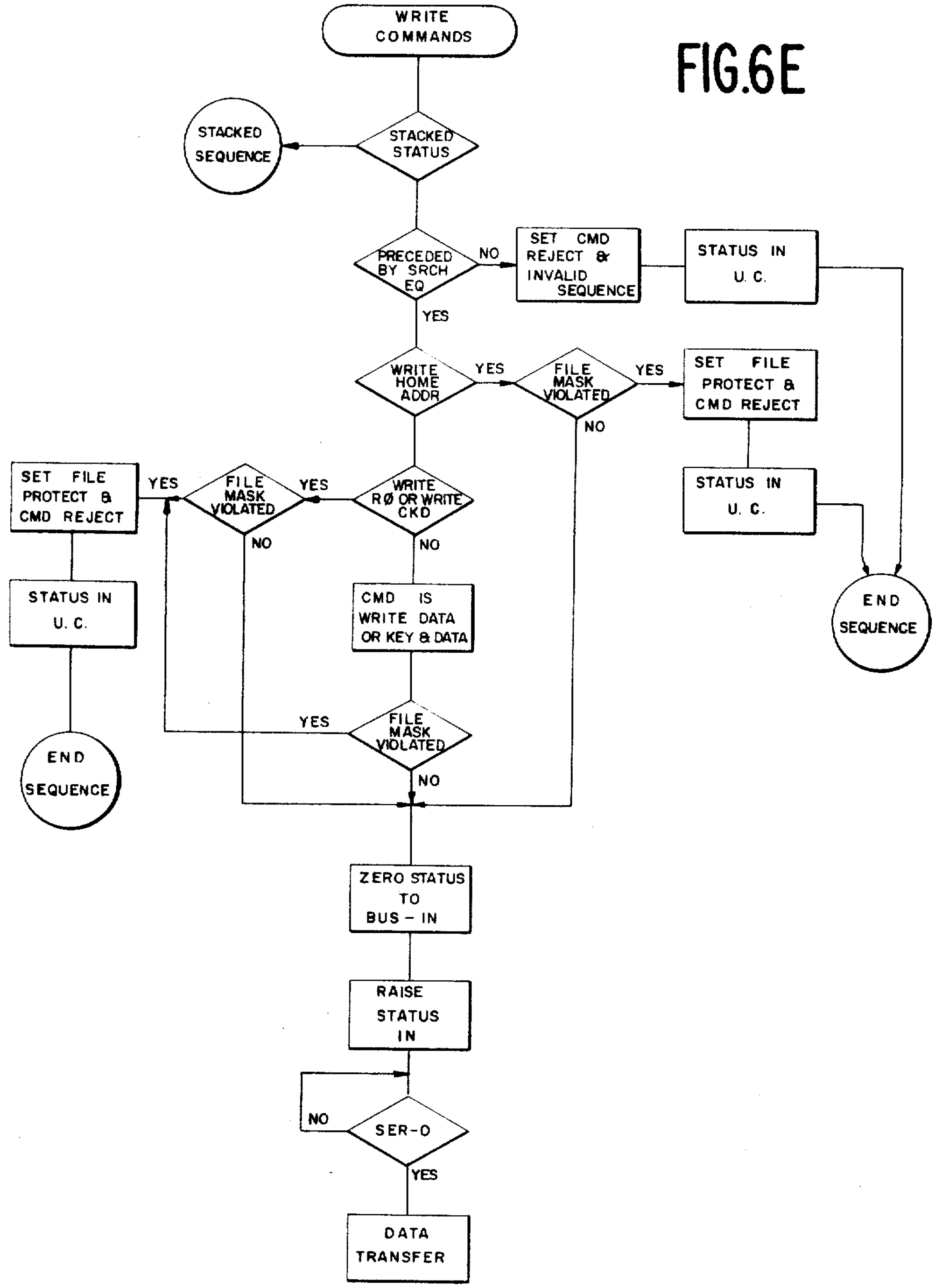

Returning now to the SEEK command which is the first command of a channel program and is under control of the Control Program of the CPU, this command is executed in the same sequence as that previously described with reference to FIG. 6D. However, in this case no File Mask has yet been set. In other words, the boundaries of the area to which access is permitted for the purpose of this first SEEK command are the entire I/O storage device. But the control program will verify if the desired SEEK is valid from information in the named entry in the catalog. Consequently, none of the tests against the File Mask will result in a File Protect violation and the Set File Mask command will follow the SEEK command by the command chaining procedure.

Since commands can be chained, that is, can be initiated in succession, once a Channel Program specified by the problem program is established with a direct access device, and since each new command may include a request for access to a different address in storage, each Channel command must be tested for violation of the area limits allocated to the problem program in which the channel program originated.

While the invention has been particularly shown and described with reference to a preferred embodiment thereof, it will be understood by those skilled in the art that various changes in form and details may be made therein without departing from the spirit and scope of the invention.

What is claimed is:

1. In a central processing system comprising a central processing unit, a plurality of input/output devices including at least one direct access storage device, and a plurality of units at different user stations for accessing allocated areas of said direct access storage device through the control program of the central processing unit; means responsive to a problem program originating at any one of said user stations, for establishing a channel program for transmission of data between a unit at said one user station and an area of said direct access storage device allocated to said unit and identified by name in the problem program, and means also responsive to said problem program for setting up a mask to exclude access of said unit to any area of said direct access storage device other than the one allocated to it.

2. A system as described in claim 1, wherein said areas are defined by geometrical boundary limits in said direct access storage device.

3. A system as described in claim 1, wherein information is stored in said direct access storage device in the form of unit records, each record including a section containing coded address information and a section containing coded data, and wherein said mask means includes means to prevent access to a particular one of said sections of every record in the allocated area.

4. A system as described in claim 1, wherein the problem program which establishes a channel program for transfer of data between the direct access storage device and the unit at said one user station includes a designation determining whether the access is to be for either of two types of writing, namely, for updating or for adding new data, and said mask means includes means for limiting the access to the direct access storage device including means responsive to said designation to prevent either one or the other of said types of access.

5. A system as described in claim 1, wherein the problem program which establishes a channel program for transfer of data between the direct access storage device and the unit at said one user station includes a designation determining whether the access is to be limited to either one of two types, namely, reading or writing, and said mask means includes means for limiting the access to the direct access storage device including means responsive to said designation to prevent either one or the other of said two types of access.

6. A system as described in claim 1, including means responsive to said mask means for terminating any program in which the problem program information disagrees with the mask.

7. A system as described in claim 6, including means to register a notation of the fact of termination of the program and of the reasons for the termination.

8. A system as described in claim 7, including means to report the fact of the termination of the program and the reason for the termination to the central processing unit.

9. A system as described in claim 8, including means for reporting back to the station which originated the program which was interrupted, the fact of the interruption of the program and the reason for the interruption.

10. In a central processing system comprising a central processing unit, a plurality of input/output devices including at least one direct access storage device, and a plurality of units at different user stations for accessing allocated areas of said direct access storage device through the control program of the central processing unit; means responsive to a problem program originating at any one of said user stations, for establishing a channel program for transmission of data between a unit at said one user station and an area of said direct access storage device allocated to said unit and identified by name in the problem program, and means also responsive to said problem program for setting up a mask to prevent transmission of data to said unit from any other area of the direct access storage device.

References Cited

UNITED STATES PATENTS

| | | | |
|---|---|---|---|
| 3,298,001 | 1/1967 | Couleur et al. | 340—172.5 |
| 3,283,308 | 11/1966 | Klein et al. | 340—172.5 |
| 3,264,615 | 8/1966 | Case et al. | 340—172.5 |
| 3,048,332 | 8/1962 | Brooks et al. | 340—172.5 |

ROBERT C. BAILEY, *Primary Examiner.*

G. D. SHAW, *Assistant Examiner.*

UNITED STATES PATENT OFFICE

CERTIFICATE OF CORRECTION

Patent No. 3,368,207 February 6, 1968

William F. Beausoleil et al.

It is hereby certified that error appears in the above numbered patent requiring correction and that the said Letters Patent should read as corrected below.

Column 1, line 14, for "projection" read -- protection --; column 3, line 68, for "program." read -- program, --; column 6, lines 66 to 68, for "reging at 4, the test of "counter < 4" produces a "no" output" read -- register. If the decision "equal or low" produces a "no" output --.

Signed and sealed this 15th day of April 1969.

(SEAL)

Attest:

Edward M. Fletcher, Jr.

Attesting Officer

EDWARD J. BRENNER

Commissioner of Patents